US007024087B2

(12) United States Patent
Shimada et al.

(10) Patent No.: US 7,024,087 B2
(45) Date of Patent: Apr. 4, 2006

(54) OPTICAL WAVEGUIDE AND METHOD OF FORMING THE SAME

(75) Inventors: Mikihiro Shimada, Kadoma (JP); Tsuguhiro Korenaga, Katano (JP); Masanori Iida, Katano (JP); Hiroyuki Asakura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 73 days.

(21) Appl. No.: 10/432,212

(22) PCT Filed: Nov. 27, 2001

(86) PCT No.: PCT/JP01/10304

§ 371 (c)(1), (2), (4) Date: Oct. 24, 2003

(87) PCT Pub. No.: WO02/44776

PCT Pub. Date: Jun. 6, 2002

(65) Prior Publication Data

US 2004/0047580 A1 Mar. 11, 2004

(30) Foreign Application Priority Data

Nov. 30, 2000 (JP) ............................. 2000-364173

(51) Int. Cl.
G02B 6/10 (2006.01)

(52) U.S. Cl. .................... 385/132; 250/227.26
(58) Field of Classification Search ............. 385/10, 385/14, 132, 39, 88, 49; 372/45, 50; 250/227.26
See application file for complete search history.

(56) References Cited

U.S. PATENT DOCUMENTS

| 4,909,584 A | | 3/1990 | Imoto et al. |
| 5,559,914 A | * | 9/1996 | Asakura ...................... 385/49 |
| 5,747,796 A | * | 5/1998 | Heard et al. ........... 250/227.26 |
| 6,445,857 B1 | * | 9/2002 | Korenaga et al. ............. 385/52 |
| 2003/0035634 A1 | * | 2/2003 | Shimada et al. .............. 385/88 |
| 2004/0126052 A1 | * | 7/2004 | Kamei et al. ................. 385/14 |
| 2004/0184705 A1 | * | 9/2004 | Shimada et al. .............. 385/14 |

FOREIGN PATENT DOCUMENTS

| JP | 2000-187126 | 7/2000 |
| JP | 2000-214340 | 8/2000 |
| JP | 2000-292631 | 10/2000 |

OTHER PUBLICATIONS

International Search Report corresponding to application No. PCT/JP01/10304 dated Mar. 19, 2002.
English translation of Form PCT/ISA/210.

* cited by examiner

*Primary Examiner*—Akm Enayet Ullah
(74) *Attorney, Agent, or Firm*—RatnerPrestia

(57) ABSTRACT

A first substrate on which an optical-waveguide groove is formed and a second substrate. The second substrate is bonded to the plane of the first substrate on which the optical-waveguide groove is formed by a material having a refractive index higher than those of the first substrate and second substrate. The optical-waveguide groove is filled with the material, and the refractive index of the first substrate is different from the refractive index of the second substrate.

14 Claims, 9 Drawing Sheets

OPTICAL WAVEGUIDE AND METHOD OF FORMING THE SAME

This application is a U.S. National Phase Application of PCT International Application PCT/JP01/10304.

TECHNICAL FIELD

The present invention relates to an optical waveguide mainly used for optical communication and a method of forming the same.

BACKGROUND ART

In recent years, optical communication systems having a wide frequency band together with wavelength division multiplexing or bidirectional transmission have realized high speed and advanced functions in public communication and computer networks.

In the field of optical communication, optical integrated circuits having various functions have been studied in order to perform advanced optical signal processing. An optical integrated circuit is basically formed by an optical waveguide, which propagates light by covering a core region. The core region has a high refractive index with a clad layer having a relatively low refractive index and hereby confining the light in the core region and realizing various functions of patterning and arranging cores. Particularly, a quartz-based optical waveguide has many advantages such as low loss, physical chemical stability, and adjustability with an optical fiber and serves as a typical passive optical waveguide.

A typical optical-waveguide forming method uses the flame deposition method as a core-clad-film forming method and the reactive-ion etching method as a core-pattern forming method. The CVD method, vacuum deposition method, and sputtering method are proposed as core-clad forming methods in addition to the flame deposition method.

Though many methods as proposed as described above, yet have achieved an optical-waveguide forming method having high performance, mass productivity, and low cost. This is because each of the film forming methods has both advantages and disadvantages. For example, a high-quality core can be formed by the flame deposition method or CVD method. However, the flame deposition method requires high-temperature annealing at 1,0000° C. or higher for more than ten hours a plurality of times and the CVD method has a difficult point in mass production that a film-forming area is narrow. Moreover, though the electron-beam deposition method or sputtering method can realize small-loss film formation, there is a problem in cost as an optical-waveguide forming process normally requiring a film thickness of ten to tens of microns because a film forming rate is low.

To solve the above problems on formation of an optical waveguide, it is a known optical-waveguide process to form a groove on a substrate serving as a lower clad. The groove is filled with a material having a higher refractive index than the substrate, and the groove is used as a core because the core can be realized in a short time.

FIGS. 5(a) to 5(c) show the above type of optical-waveguide forming method. First, as shown in FIG. 5(a), a substrate 51 on which an optical-waveguide groove is formed is filled with a high-refractive-index material 52 used as a core.

Then, as shown in FIG. 5(b), extra high-refractive-index material is removed from the high-refractive-index material having been filled in the step shown in FIG. 5(a).

Then, as shown in FIG. 5(c), a clad substrate 53 and the optical-waveguide-groove substrate 51 are finally bonded together.

However, the above optical waveguide has the following problems with respect to cost and performance.

In the case of the forming method of filling an optical-waveguide groove shown in FIG. 5, if a high-refractive-index material is present as an adhesive layer, the light confined in a core leaks to the adhesive-layer portion. Therefore, the step of removing extra core material when a core material is packed (FIG. 5(b)) is necessary and the formation cost is increased.

Moreover, to constitute a three-dimensional circuit, it is necessary to remove extra material for each layer.

Furthermore, even if a step of removing extra material added, a core having a predetermined dimension cannot be obtained when the accuracy of the step is not sufficient. However, it is difficult to control the accuracy.

Moreover, when the extra material is not completely removed, it remains as a waveguide layer. Particularly, when polishing, fine scratches are produced at a waveguide portion, and the scratches cause wave-guided light to scatter. Therefore, such an optical waveguide is not suitable for mass production and it is difficult to reduce the cost of the waveguide.

That is, a conventional optical waveguide has a problem that the waveguide is not suitable for mass production and it is difficult to reduce the cost of the waveguide.

DISCLOSURE OF THE INVENTION

The present invention is made to solve the above problems of a conventional optical waveguide and its object is to provide an optical waveguide having high performance, mass productivity, and low cost and an optical-waveguide forming method.

To solve the above problem, a first aspect of the invention is an optical waveguide comprising:

a first substrate on which an optical-waveguide groove is formed and a second substrate, characterized in that said second substrate is bonded to a plane of said first substrate on which said optical-waveguide groove is formed by a material having a refractive index higher than those of said first and second substrates, said optical-waveguide groove is filled with said material, and the refractive index of said first substrate is different from that of said second substrate.

A second aspect of the invention of the present invention is the optical waveguide according to the first aspect of the present invention, characterized in that by assuming the refractive index of said material as Na, that of said first substrate as Nb, that of said second substrate as Nc, the thickness of said material present between said second substrate and a portion other than said optical-waveguide groove on the plane on which the optical-waveguide groove of said first substrate is formed as d, the depth of said optical-waveguide groove as h, the wavelength of wave-guiding light as λ, (1) when said Nb is not smaller than said Nc, said Na, Nb, Nc, d, h, and λ simultaneously satisfy the following numerical formulas, $$d \leq \frac{\lambda}{2\pi\sqrt{Na^2 - Nb^2}} \tan^{-1}\left(\frac{\sqrt{Nb^2 - Nc^2}}{\sqrt{Na^2 - Nb^2}}\right) \quad \text{[Numerical Formula 1]}$$

$$\frac{\lambda}{2\pi\sqrt{Na^2 - Nb^2}} \tan^{-1}\left(\frac{\sqrt{Nb^2 - Nc^2}}{\sqrt{Na^2 - Nb^2}}\right) < h \quad \text{[Numerical Formula 2]}$$

and (2) when said Nb is smaller than said Nc, said Na, Nb, Nc, d, h, and $\lambda$ simultaneously satisfy the following numerical formulas.

$$d \leq \frac{\lambda}{2\pi\sqrt{Na^2 - Nc^2}} \tan^{-1}\left(\frac{\sqrt{Nc^2 - Nb^2}}{\sqrt{Na^2 - Nc^2}}\right) \quad \text{[Numerical Formula 3]}$$

$$\frac{\lambda}{2\pi\sqrt{Na^2 - Nc^2}} \tan^{-1}\left(\frac{\sqrt{Nc^2 - Nb^2}}{\sqrt{Na^2 - Nc^2}}\right) < h \quad \text{[Numerical Formula 4]}$$

A third aspect of the present invention is the optical waveguide according to the first aspect of the present invention, characterized in that an optical-waveguide groove is also formed on the plane of said second substrate bonded to said first substrate, and the optical waveguide of said second substrate is filled with said material.

A fourth aspect of the present invention is the optical waveguide according to the first aspect of the present invention, characterized in that a third substrate bonded by said material is provided for the plane opposite to the plane of said second substrate bonded to said first substrate, an optical-waveguide groove is also formed on the plane of said third substrate bonded to said second substrate, the optical-waveguide groove of said third substrate is filled with said material, said material has a refractive index higher than that of said third substrate, and the refractive index of said second substrate is different from the refractive index of said third substrate.

A fifth aspect of the present invention is the optical waveguide according to any one of the first to the fourth aspects of the present invention, characterized in that said material is a glass-based material or resin.

A sixth aspect of the present invention is the optical waveguide according to the fifth aspect of the present invention, characterized in that said material is a photo-curing resin, and the expression of bonding together by said material denotes bonding together by applying light to said photo-curing resin and curing the resin.

A seventh aspect of the present invention is the optical waveguide according to any one of the first to the fourth aspects of the present invention, characterized in that said substrate is formed by a glass-based material or a resin.

An eighth aspect of the present invention is the optical waveguide according to any one of the first to the fourth aspects of the present invention, characterized in that concave and convex portions of said optical-waveguide groove are collectively formed through molding by a mold material having concave and convex portions on its surface.

A ninth aspect of the present invention is an optical-waveguide forming method of forming an optical waveguide having at least a first substrate and a second substrate bonded to said first substrate, in which an optical-waveguide groove is formed on the bonded plane of at least either of said first and second substrates, comprising:

a step of making the refractive index of said first substrate different from the refractive index of said second substrate by applying light to at least either of said first and second substrates and thereby changing refractive indexes; and a step of bonding said first and second substrates different from each other in refractive index together by a material having a refractive index higher than refractive indexes of said first and second substrates.

A tenth aspect of the present invention is an optical-waveguide forming method of forming an optical waveguide having at least a first substrate and a second substrate bonded to said first substrate, in which an optical-waveguide groove is formed on the bonded plane of at least either of said first and second substrates, comprising:

a step of making the refractive index of said first substrate different from the refractive index of said second substrate by heating and cooling at least either of said first or second substrates and thereby changing refractive indexes, and a step of bonding said first and second substrates whose refractive indexes are made different from each other by a material having a refractive index higher than those of said first and second substrates.

An eleventh aspect of the present invention is the optical-waveguide forming method according to the ninth or the tenth aspect of the present invention, characterized in that by assuming the refractive index of said material as Na, that of said first substrate as Nb, that of said second substrate as Nc, the thickness of said material present between said second substrate and a portion other than said optical-waveguide groove on the plane on which the optical-waveguide groove of said first substrate is formed as d, the depth of said optical-waveguide groove as h, the wavelength of wave-guiding light as $\lambda$, (1) when said Nb is not smaller than said Nc, said Na, Nb, Nc, d, h, and $\lambda$ simultaneously satisfy the following numerical formulas, $$d \leq \frac{\lambda}{2\pi\sqrt{Na^2 - Nb^2}} \tan^{-1}\left(\frac{\sqrt{Nb^2 - Nc^2}}{\sqrt{Na^2 - Nb^2}}\right) \quad \text{[Numerical Formula 1]}$$

$$\frac{\lambda}{2\pi\sqrt{Na^2 - Nb^2}} \tan^{-1}\left(\frac{\sqrt{Nb^2 - Nc^2}}{\sqrt{Na^2 - Nb^2}}\right) < h \quad \text{[Numerical Formula 2]}$$

and (2) when said Nb is smaller than said Nc, said Na, Nb, Nc, d, h, and $\lambda$ simultaneously satisfy the following numerical formulas.

$$d \leq \frac{\lambda}{2\pi\sqrt{Na^2 - Nc^2}} \tan^{-1}\left(\frac{\sqrt{Nc^2 - Nb^2}}{\sqrt{Na^2 - Nc^2}}\right) \quad \text{[Numerical Formula 3]}$$

$$\frac{\lambda}{2\pi\sqrt{Na^2 - Nc^2}} \tan^{-1}\left(\frac{\sqrt{Nc^2 - Nb^2}}{\sqrt{Na^2 - Nc^2}}\right) < h \quad \text{[Numerical Formula 4]}$$

A twelfth aspect of the present invention is the optical-waveguide forming method according to the tenth aspect of the present invention, characterized in that when making the refractive index of said first substrate different from the refractive index of said second substrate, even the other-hand substrate is heated at a temperature different from the case of one-hand substrate to change refractive indexes.

A thirteenth aspect of the present invention is the optical-waveguide forming method according to the tenth aspect of the present invention), characterized in that when making the refractive index of said first substrate different from the refractive index of said second substrate, not only one-hand substrate but also the other-hand substrate are heated and cooled for periods different from each other to change refractive indexes.

A fourteenth aspect of the present invention is the optical-waveguide forming method according to the ninth or the tenth aspect of the present invention, characterized in that at least either of said first and second substrates is heated and softened to form said optical-waveguide groove by pressing a mold material having concave and convex portions on the surface against the substrate.

Figure 1:
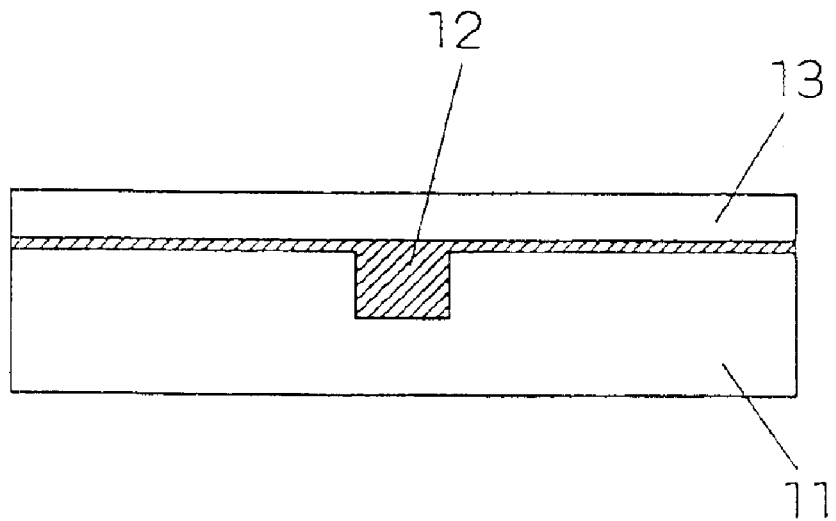
FIG. 1 is an illustration showing an optical waveguide of a first embodiment of the present invention.

DESCRIPTION OF SYMBOLS 11, 51 . . . Optical-waveguide-groove substrate
31, 41 . . . First optical-waveguide-groove substrate
12, 32, 42, 52 . . . High-refractive-index material
13, 33, 44, 53 . . . Clad substrate
33, 43 . . . Second optical waveguide substrate

BEST MODE FOR CARRYING OUT THE INVENTION

Embodiments of the present invention are described below by referring to accompanying drawings. Components provided with the same reference numeral in the drawings denote the same components.

(First Embodiment)

FIG. 1 shows the optical waveguide of the first embodiment of the present invention.

First, an optical-waveguide groove is formed on the surface of the substrate 11 made of glass or transparent resin through molding using a mold (not illustrated) as shown in FIG. 1.

Then, an ultraviolet-curing resin is applied to an optical-waveguide-groove forming plane as the high-refractive-index material 12 and filled into a groove. Then, the optical-waveguide-groove substrate 11 and the clad substrate 13 having a refractive index different from that of the substrate 11 are bonded together. The ultraviolet-curing resin is applied by means of spin coating at a revolving speed of 500 to 7,000 rpm. The ultraviolet-curing resin in the groove is cured through irradiation with ultraviolet radiation. By using a resin having a refractive index higher than those of the optical-waveguide-groove substrate 11 and clad substrate 13 as an ultraviolet-curing resin, the ultraviolet-curing resin in the groove functions as an optical-waveguide core. As a result of observing the adhesive layer of the optical waveguide thus formed with an optical microscope, it is found that the thickness of the adhesive layer is approx. 1 μm.

Figure 2A:
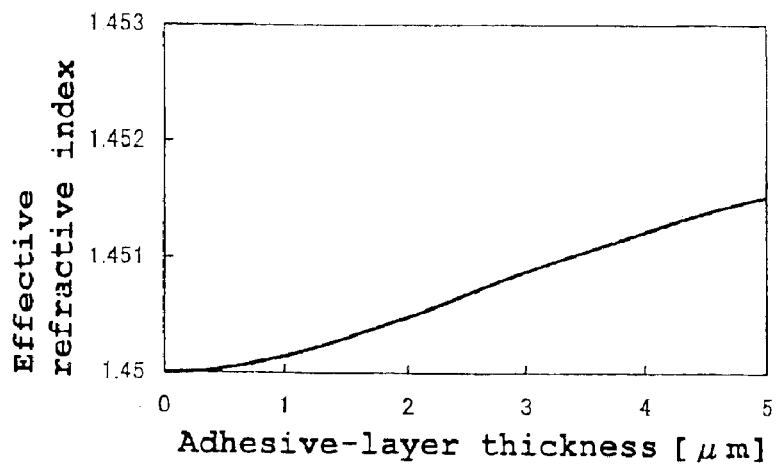
FIG. 2(a) is an illustration showing a relation between adhesive-layer thickness and effective refractive index calculated by assuming the refractive index of a waveguide core as 1.453, that of a clad substrate 13 as 1.45, and that of an optical waveguide substrate 11 as 1.45 equal to the refractive index of the clad substrate 13 of the first embodiment of the present invention.
Figure 2B:
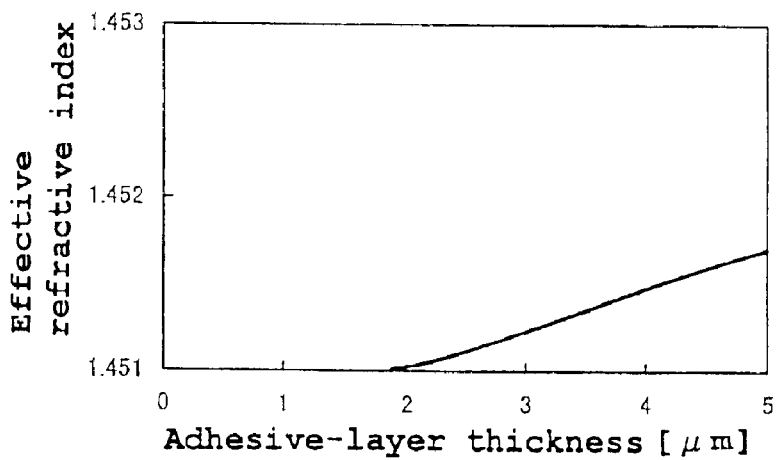
FIG. 2(b) is an illustration showing a relation between adhesive-layer thickness and effective refractive index when increasing the refractive index of the clad substrate 13 of the first embodiment of the present invention by 0.001 from the example shown in FIG. 2(a)
Figure 2C:
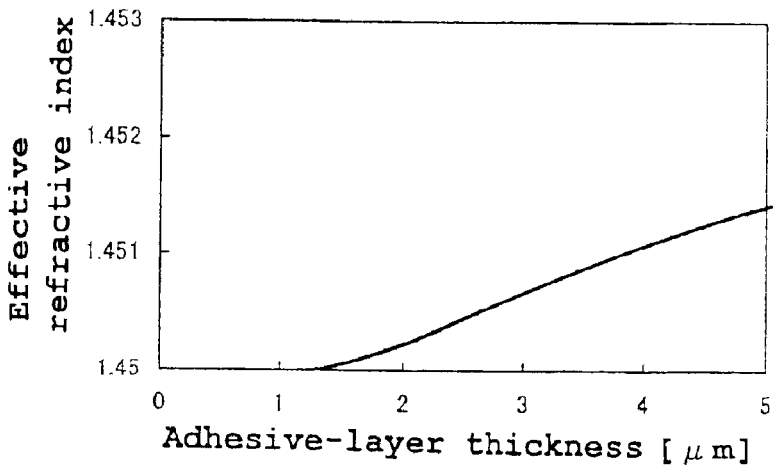
FIG. 2(c) is an illustration showing a relation between adhesive-layer thickness and effective refractive index when decreasing the refractive index of the clad substrate 13 of the first embodiment of the present invention by 0.001 from the example shown in FIG. 2(a)

FIGS. 2(a) to 2(c) show effects obtained by changing refractive indexes of the clad substrate 13 and optical-waveguide-groove substrate 11 by using a result of simulation. In FIGS. 2(a) to 2(c), the axis of abscissa shows a thickness of an adhesive layer and the axis of ordinate shows an effective refractive index, and a point at which the continuous line of a graph intersects with the axis of abscissa shows a cutoff film thickness. When the thickness of the adhesive layer is smaller than the cutoff film thickness, a wave-guiding mode is not present. However, a wavelength is set to 1.3 μm in every calculation.

FIG. 2(a) shows a result of performing calculation by assuming the refractive index of a waveguide core as 1.453, that of the clad substrate 13 as 1.45, and that of the optical-waveguide-groove 11 as 1.45 equal to the refractive index of the clad substrate 13. In this case, because the continuous line intersects at the origin, a wave-guiding mode is present even if an adhesive layer is made thin and light propagates through the adhesive layer.

However, when increasing the refractive index of the clad substrate 13 to 1.451 by 0.001, a cutoff film thickness becomes 1.8 μm as shown in FIG. 2(b) and thus, no wave is guided as long as the thickness is 1.8 μm or less even if an adhesive layer is present.

Moreover, when decreasing the refractive index of the clad layer 13 to 1.449 by 0.001, a cutoff film thickness becomes 1.2 μm as shown in FIG. 2(c) and no wave is guided as long as the thickness is 1.2 μm or less even if an adhesive layer is present similarly to the case of increasing the refractive index of the clad substrate 13.

Therefore, by changing refractive indexes of the optical-waveguide-groove substrate 11 and clad substrate 13, it is possible to prevent light from leaking even if an adhesive-layer removing step is not executed.

Thus, a condition necessary to prevent light from leaking even if the adhesive-layer removing step is not executed is more minutely studied through simulation. As a result, it is found that the following is necessary.

Figure 7:
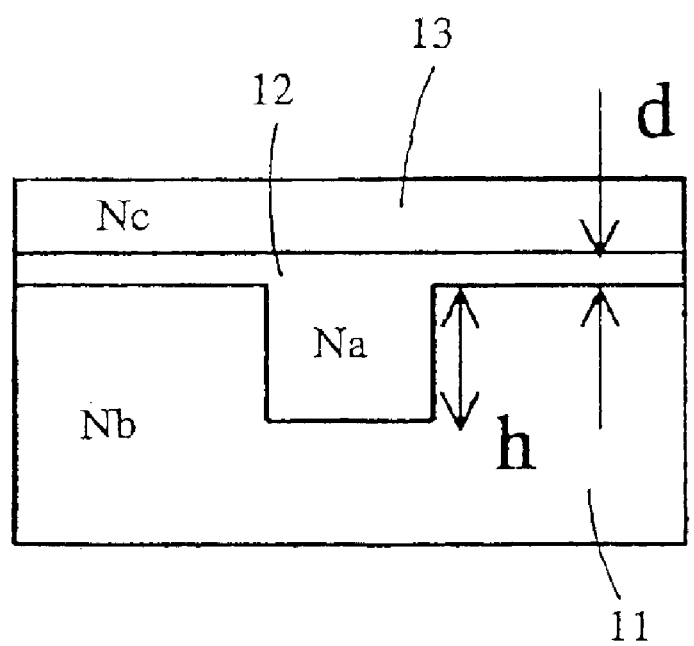
FIG. 7 is an illustration sowing a parameter of the optical waveguide of the first embodiment of the present invention.

That is, as shown in FIG. 7, the refractive index of the optical-waveguide-groove substrate 11 is assumed as Nb, the depth of the optical-waveguide groove formed on the optical-waveguide-groove substrate 11 is assumed as h, the refractive index of the high-refractive-index material 12 is assumed as Na, and the refractive index of the clad substrate 13 is assumed as Nc. Moreover, the thickness of an adhesive layer is assumed as d and the wavelength of wave-guiding light is assumed as λ.

Thus, when Na is larger than Nb and Nb is larger than Nc, it is found that these parameters should simultaneously satisfy the following numerical formulas 1 and 2.

$$d \leq \frac{\lambda}{2\pi\sqrt{Na^2 - Nb^2}} \tan^{-1}\left(\frac{\sqrt{Nb^2 - Nc^2}}{\sqrt{Na^2 - Nb^2}}\right) \quad \text{[Numerical Formula 1]}$$

$$\frac{\lambda}{2\pi\sqrt{Na^2 - Nb^2}} \tan^{-1}\left(\frac{\sqrt{Nb^2 - Nc^2}}{\sqrt{Na^2 - Nb^2}}\right) < h \quad \text{[Numerical Formula 2]}$$

That is, when these parameters satisfy the above numerical formulas 1 and 2, light does not leak to an adhesive layer even if the adhesive-layer removing step is not executed.

Moreover, when Na is larger than Nc and Nc is larger than Nb, it is found that these parameters should satisfy the following numerical formulas 3 and 4.

$$d \leq \frac{\lambda}{2\pi\sqrt{Na^2 - Nc^2}} \tan^{-1}\left(\frac{\sqrt{Nc^2 - Nb^2}}{\sqrt{Na^2 - Nc^2}}\right) \quad \text{[Numerical Formula 3]}$$

$$\frac{\lambda}{2\pi\sqrt{Na^2 - Nc^2}} \tan^{-1}\left(\frac{\sqrt{Nc^2 - Nb^2}}{\sqrt{Na^2 - Nc^2}}\right) < h \quad \text{[Numerical Formula 4]}$$

That is, when these parameters simultaneously satisfy the numerical formulas 3 and 4, light does not leak to the adhesive layer even if the adhesive-layer removing step is not executed.

Specifically, assuming Na as 1.507, Nc as 1.504, d as 1 μm, h as 8 μm, and λ as 1.3 μm, and when Nb smaller than Na and larger than Nc is not smaller than 1.5045 and it is smaller than 1.50664, wave-guiding light does not leak to the adhesive layer.

Furthermore, assuming Na as 1.507, Nc as 1.503, d as 1 μm, h as 8 μm, and λ as 1.3 μm, and when Nb smaller than Na and larger than Nc is not smaller than 1.50383 and it is smaller than 1.50664, wave-guiding light does not leak to the adhesive layer.

Thus, when the above conditions are satisfied, wave-guiding light does not leak to the adhesive layer even if the thickness d of the adhesive layer is larger than zero.

Figure 8:
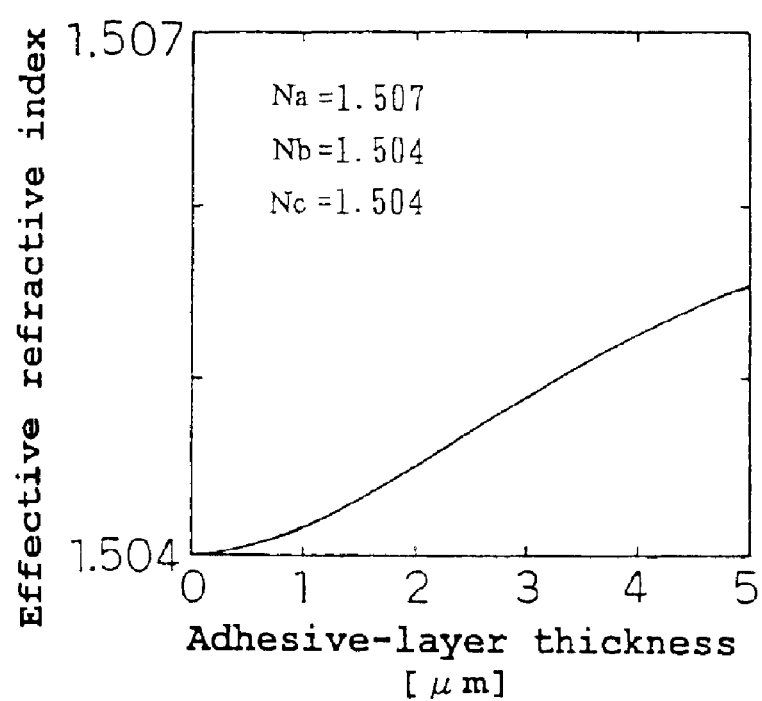
FIG. 8 is an illustration showing a relation between adhesive-layer thickness and effective refractive index calculated by assuming the refractive index of a waveguide core as 1.507, that of a clad substrate 13 as 1.504, and that of an optical waveguide groove substrate 11 as 1.504 equal to the refractive index of the clad substrate 13 of the first embodiment of the present invention.

FIG. 8 shows a relation between adhesive-layer thickness and effective refractive index when h is 8 μm, λ is 1.3 μm, Na is 1.507, Nb is 1.504, and Nc is 1.504. In this case, because a continuous line intersects at the origin, a wave-guiding mode is present even if the adhesive layer is made thin and light propagates through the adhesive layer.

Figure 9A:
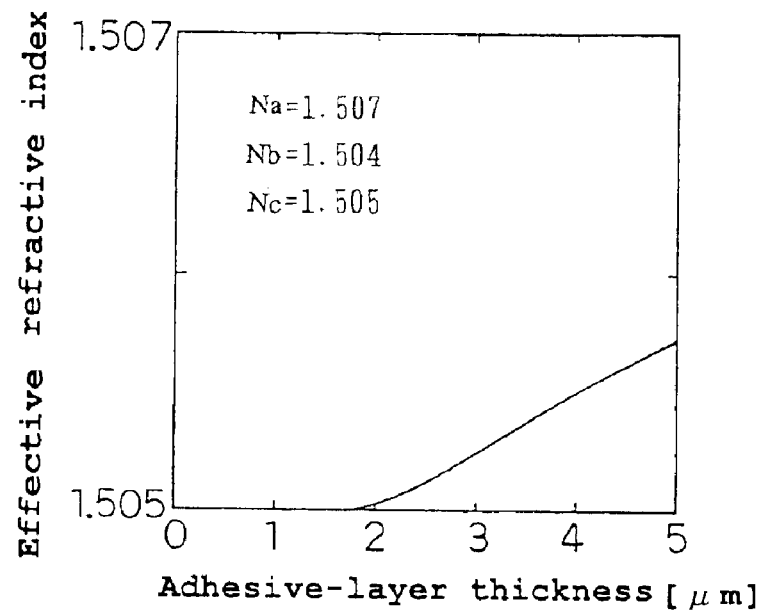
FIG. 9(a) is an illustration showing a relation between adhesive layer thickness and effective refractive index when increasing the refractive index of the clad substrate 13 of the first embodiment of the present invention by 0.001 from the example shown in FIG. 8.

FIG. 9(a) shows a relation between adhesive-layer thickness and effective refractive index when increasing Nc by 0.001. That is, FIG. 9(a) shows a relation between adhesive-layer thickness and effective refractive index when h is 8 μm, λ is 1.3 μm, Na is 1.507, Nb is 1.504, and Nc is 1.505.

In this case, the cutoff film thickness becomes 1.8 μm, and no wave is guided when a cutoff film thickness is 1.8 μm or less even if an adhesive layer is present.

Figure 9B:
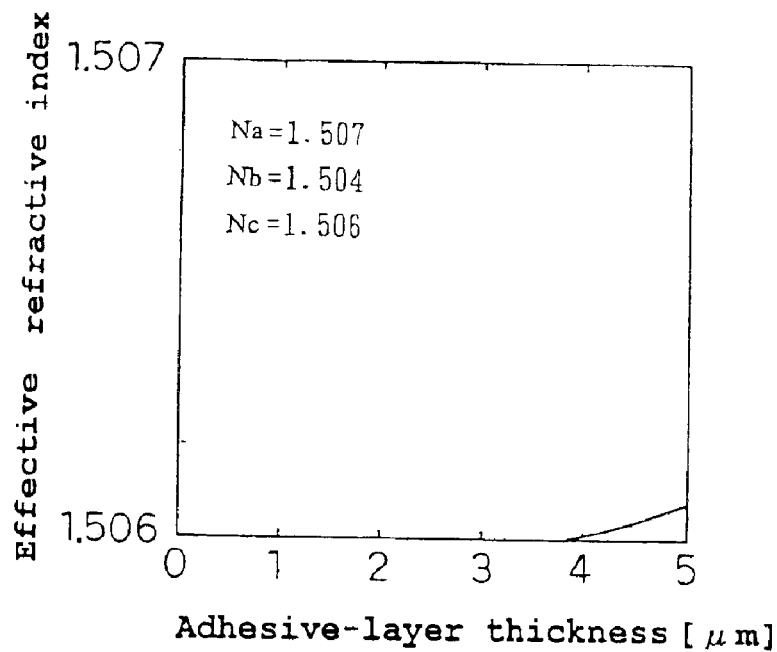
FIG. 9(b) is an illustration showing a relation between adhesive layer thickness and effective refractive index when further increasing the refractive index of the clad substrate 13 of the first embodiment of the present invention by 0.001 from the example shown in FIG. 9(a)

Moreover, FIG. 9(b) shows a case in which Nc is further increased by 0.001 from the case of FIG. 9(a). That is, FIG.

9(b) shows a relation between adhesive-layer thickness and effective refractive index when h is 8 µm, λ is 1.3 µm, Na is 1.507, Nb is 1.504, and Nc is 1.506.

In this case, a cutoff film thickness becomes 3.8 µm but no wave is guided when the thickness is 3.8 µm or less even if an adhesive layer is present. That is, when Nb is larger than Nc, wave-guiding light does not propagate through the adhesive layer even if the adhesive layer becomes thicker if the difference between refractive indexes of Nc and Nb increases.

Figure 10A:
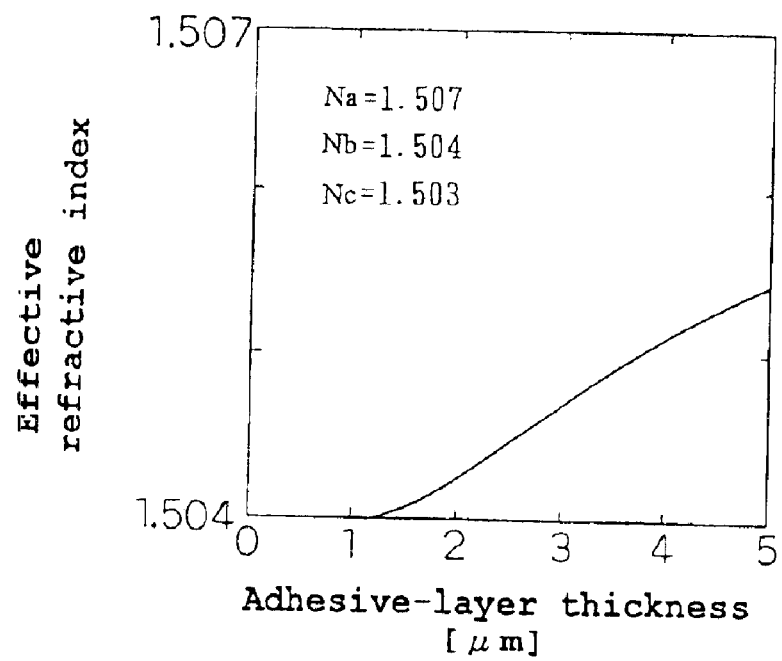
FIG. 10(a) is an illustration showing a relation between adhesive layer thickness and effective refractive index when decreasing the refractive index of the clad substrate 13 of the first embodiment of the present invention by 0.001 from the example shown in FIG. 8.

FIG. 10(a) shows a relation between adhesive-layer pressure and effective refractive index when decreasing Nc by 0.001 compared to the case of FIG. 8. That is, FIG. 10(a) shows a relation between adhesive-layer thickness and effective refractive index when h is 8 µm, λ is 1.3 µm, Na is 1.507, Nb is 1.504, and Nc is 1.503.

In this case, the cutoff film thickness becomes 1.3 µm and no wave is guided when the thickness is 1.3 µm or less even if the adhesive layer is present.

Figure 10B:
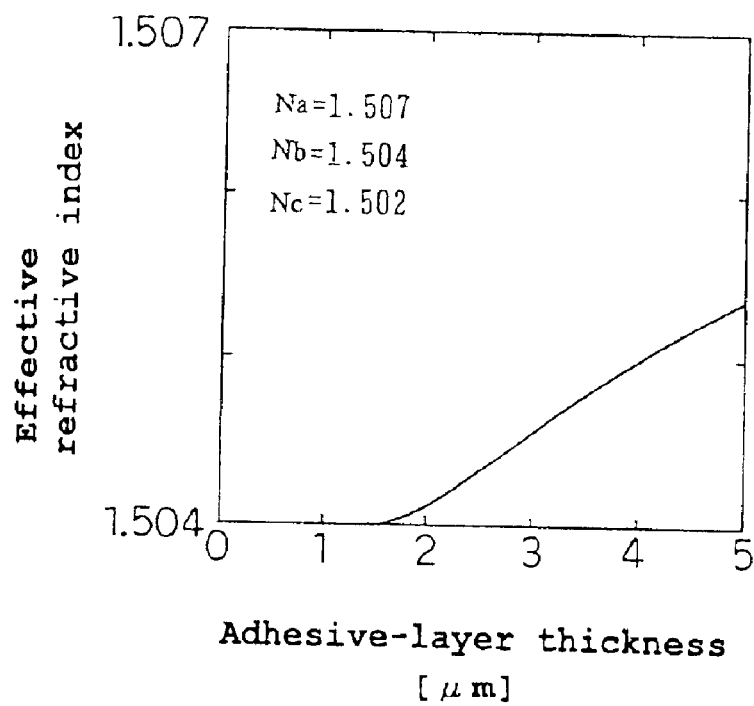
FIG. 10(b) is an illustration showing a relation between adhesive layer thickness and effective refractive index when further decreasing the refractive index of the clad substrate 13 of the first embodiment of the present invention by 0.001 from the example shown in FIG. 9(a).

Furthermore, FIG. 10(b) shows a case in which Nc is decreased by 0.001 from the case of FIG. 10(a). That is, FIG. 10(b) shows a relation between adhesive-layer thickness and effective refractive index when h is 8 µm, λ is 1.3 µm Na is 1.507, Nb is 1.504, and Nc is 1.502.

In this case, the cutoff film thickness becomes 1.6 µm and no wave is guided when a cutoff film thickness is 1.6 µm or less even if an adhesive layer is present.

Thus, also when Nc is larger than Nb, it can be said that wave-guiding light does not propagate through an adhesive layer even if the thickness of the adhesive layer further increases when the difference in refractive index increases.

Thus, it is possible to obtain an optical waveguide in which wave-guiding light does not leak to an adhesive layer even if the adhesive layer is present by selecting conditions satisfying the numerical formulas 1 and 2 when Na is larger than Nb and Nb is larger than Nc and those satisfying the numerical formulas 3 and 4 when Na is larger than Nc and Nc is larger than Nb as parameters shown in FIG. 7.

The optical-waveguide-groove substrate 11 of this embodiment serves as a first substrate of the present invention and the clad substrate 13 of this embodiment serves as a second substrate of the present invention.

Moreover, the second substrate of the present invention is not restricted to a substrate of changing the refractive index of the clad substrate 13 as shown in this embodiment. In short, it is only necessary that the second substrate of the present invention is different from the first substrate of the present invention in refractive index such as a substrate changing the refractive index of the optical-waveguide-groove substrate 11.

Furthermore, though a refractive-index change is calculated as 0.001 in the case of this embodiment, the change is not restricted to 0.001. It is allowed to change a refractive index as long as refractive indexes of the clad substrate 13 and optical-waveguide-groove substrate 11 do not exceed the refractive index of a core.

Furthermore, though a wavelength is calculated as 1.3 µm in the case of this embodiment, the wavelength is not restricted to 1.3 µm. Other wavelengths are also considered by generalizing them.

Furthermore, though an ultraviolet-curing resin is used as an optical-waveguide core material in the case of this embodiment, the core material is not restricted to the resin. It is also allowed to use a thermosetting resin or glass-based material.

Furthermore, though spin coating is used as a method of coating a high-refractive-index material in the case of this embodiment, the coating method is not restricted to the spin coating. It is allowed to use dip coating or spray coating.

Furthermore, though it is preferable to form an optical waveguide groove through molding as described for this embodiment from the viewpoint of productivity, formation of the groove is not restricted to molding. It is allowed to form the groove through etching according to necessity.

Furthermore, though one linear waveguide is described as an example, this embodiment, is not restricted to the linear waveguide. It is possible to apply this embodiment to every optical waveguide pattern generally used and moreover control bend, branch, and combination of optical waves.
(Second Embodiment)

The optical-waveguide forming method of the second embodiment of the present invention is described below.

FIGS. 6(a) to 6(d) show the optical-waveguide forming method of this embodiment.

Figure 6A:
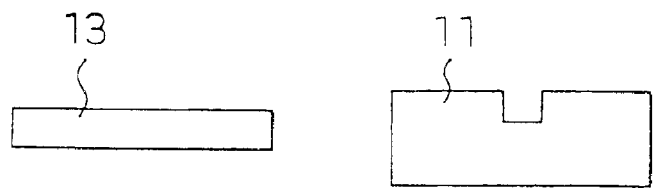
FIG. 6(a) is an illustration showing a step of forming an optical-waveguide groove through molding using a mold on the surface of the substrate 11 in an optical-waveguide forming method of a second embodiment of the present invention.

As shown in FIG. 6(a), an optical-waveguide groove is formed on the surface of a substrate 11 made of glass or transparent resin through molding using a mold (not illustrated). That is, the optical-waveguide groove is formed by heating and thereby softening the substrate 11 and pressing a mold material having concave and convex portions on its surface against the substrate 11.

Figure 6B:
FIG. 6(b) is an illustration showing a step of irradiating the substrate 11 on which an optical-waveguide groove is formed with ultraviolet radiation in the optical-waveguide forming method of the second embodiment.

Then, as shown in FIG. 6(b), ultraviolet radiation is applied to the substrate 11 on which an optical-waveguide groove is formed. By applying ultraviolet radiation to the substrate, a refractive-index change is induced due to a photochemical reaction. Therefore, it is possible to make the refractive index of the optical-waveguide-groove substrate 11 different from that of a clad substrate 13 even if using the same material for the substrates 11 and 13.

Figure 6C:
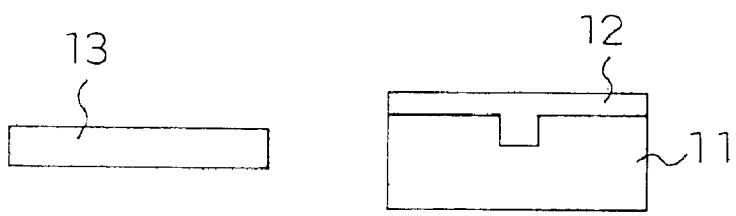
FIG. 6(c) is an illustration showing a step of applying a high-refractive-index material 12 to an optical-waveguide forming plane and filling a groove with the material 12 in the optical-waveguide forming method of the second embodiment.

Then, as shown in FIG. 6(c), a high-refractive-index material 12 is applied to an optical-waveguide-groove forming plane to fill a groove with the material 12 as shown in FIG. 6(c).

Figure 6D:
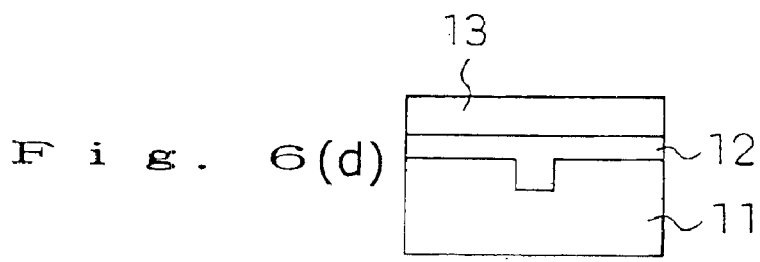
FIG. 6(d) is an illustration showing a step of bonding the optical-waveguide-groove substrate 11 irradiated with ultraviolet radiation and the clad substrate 13 not irradiated with ultraviolet radiation together in the optical-waveguide forming method of the second embodiment.

Finally, as shown in FIG. 6(d), the optical-waveguide-groove substrate 11 irradiated with ultraviolet radiation and the clad substrate 13 not irradiated with ultraviolet radiation are bonded together.

Thus, it is possible to form the optical waveguide shown in FIG. 1.

A first substrate of the present invention is not restricted to the substrate of this embodiment changing the refractive index of the substrate 11 on which an optical-waveguide groove is formed like the case of this embodiment. In short, such as changing the refractive index of the clad substrate 13, it is only necessary that the first substrate of the present invention is different from a second substrate of the present invention in refractive index.

Moreover, the first substrate of the present invention is not restricted to a substrate changing the refractive index of only the substrate 11 on which an optical waveguide groove is formed like the case of this embodiment. In short, such as irradiating the clad substrate 13 and optical-waveguide-groove substrate 11 with ultraviolet radiation by different amount of irradiation, it is only necessary that the first substrate of the present invention is different from the second substrate of the present invention in refractive index.

Furthermore, an optical-waveguide forming method of forming the optical waveguide shown in FIG. 1 is described for this embodiment. However, this embodiment is not restricted to the above method. The optical-waveguide forming method of this embodiment makes it possible to form the optical waveguide shown in FIG. 3 or 4. The optical waveguides shown in FIGS. 3 and 4 will be described later.

Furthermore, it is preferable to form an optical-waveguide groove through molding as described for this embodiment from the viewpoint of productivity. However, an optical-waveguide groove forming method is not restricted to molding. However, it is also allowed to form an optical-waveguide groove through etching according to necessity.

(Third Embodiment)

An optical-waveguide forming method of a third embodiment of the present invention is described below.

In the case of the optical-waveguide forming method of the second embodiment, the substrate 11 is irradiated with ultraviolet radiation in the step shown in FIG. 6(*b*). In the case of the third embodiment, however, a substrate 11 is heated and cooled instead.

That is, an optical waveguide groove is formed on the surface of the substrate 11 made of glass or transparent resin through molding using a mold (not illustrated) as shown in FIG. 1 similarly to the case of FIG. 6(*a*) of the second embodiment.

Then, the substrate 11 with the optical waveguide groove formed is heated. Glass has a structure corresponding to its heat history and the density of the glass at room temperature depends on a heating temperature or cooling rate. For example, rapidly-cooled glass has a volume larger than slowly-cooled glass. Therefore, the refractive index of the former is different from that of the latter depending on a heating temperature or cooling rate. Therefore, it is possible to make the refractive index of the optical-waveguide-groove substrate 11 different from that of a clad substrate 13 even if using the same material for the both substrates 11 and 13.

Then, an ultraviolet-curing resin is applied to an optical-waveguide-groove forming plane as a high-refractive-index material 12 to fill a groove with the resin.

Thereafter, the optical-waveguide-groove substrate 11 and the clad substrate 13 are bonded together. By applying ultraviolet radiation, the ultraviolet-curing resin in the groove is cured. By using a material having a refractive index higher than that of the optical-waveguide-groove substrate 11 and upper clad substrate 13 as an ultraviolet-curing resin, the ultraviolet-curing resin in the groove functions as an optical-waveguide core.

In the case of this embodiment, refractive indexes are changed by heating a substrate with an optical waveguide groove formed. It is only necessary that the clad substrate 13 is different from the optical-waveguide-groove substrate 11 in refractive index, and it is allowed to change the refractive index of the clad substrate 13.

Moreover, though refractive indexes are changed by heating only the substrate 11 with the optical-waveguide groove formed in the case of this embodiment, it is also allowed to heat two substrates at different temperatures.

Furthermore, though refractive indexes are changed by heating only the substrate 11 with the optical-waveguide groove formed in the case of this embodiment, it is also allowed to heat two substrates at the same temperature and cool them by changing cooling rates.

Furthermore, though an ultraviolet-curing resin is used as an optical-waveguide core material in the case of this embodiment, the optical-waveguide core material is not restricted to the resin. It is allowed to use a glass-based material.

Furthermore, though it is preferable to form an optical waveguide groove through molding as described for this embodiment from the viewpoint of productivity, an optical-waveguide-groove forming method is not restricted to molding. It is also allowed to form the optical-waveguide groove through etching according to necessity.

(Fourth Embodiment)

An optical waveguide of a fourth embodiment of the present invention is described below.

Figure 3:
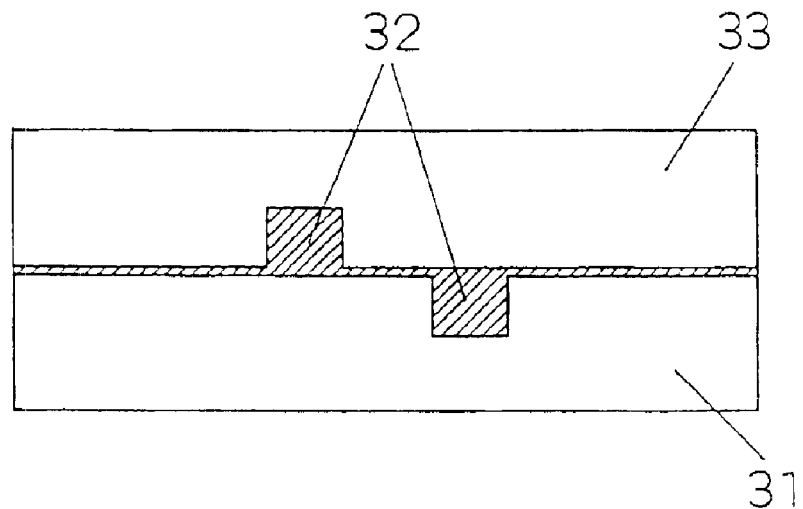
FIG. 3 is an illustration showing an optical waveguide of a fourth embodiment of the present invention.

FIG. 3 is an illustration showing an optical waveguide of the fourth embodiment of the present invention.

As shown in FIG. 3, an optical-waveguide groove is formed on the surface of a first substrate 31 made of glass or transparent resin through molding using a mold (not illustrated). Moreover, an optical-waveguide groove is formed on the surface of a second substrate 33 different from the first substrate 31 in refractive index through molding using a mold (not illustrated).

Then, an ultraviolet-curing resin is applied to an optical-waveguide-groove forming plane as a high-refractive-index material 32 to fill a groove with the resin. Thereafter, the first substrate 31 and the second substrate 33 are bonded together. By applying ultraviolet radiation, the ultraviolet-curing resin in the groove is cured. By using a material having a refractive index higher than those of the first optical-waveguide-groove substrate 31 and second optical-waveguide-groove substrate 33 as an ultraviolet-curing resin, the ultraviolet-curing resin in the groove functions as an optical-waveguide core. By using the above configuration, it is possible to fabricate an optical circuit having a higher integration degree. Moreover, by overlapping parts of a waveguide and bonding them together, it is possible to use the waveguide as a three-dimensional crossed or branched waveguide.

The first optical-waveguide-groove substrate 31 of this embodiment serves as a first substrate of the present invention and the second optical-waveguide-groove substrate 33 of this embodiment serves as a second substrate of the present invention.

Moreover, though this embodiment uses a substrate having a refractive index different from that of the first substrate as the second substrate, it is also allowed to form a groove by using the same substrate and then change refractive indexes through heat treatment or irradiation with light.

Furthermore, though this embodiment uses an ultraviolet-curing resin as an optical-waveguide core material, the core material is not restricted to the resin. It is also allowed to use a thermosetting resin or glass-based material.

Furthermore, it is preferable to form an optical-waveguide groove through molding as described for this embodiment. However, a method of forming the optical-waveguide groove is not restricted to molding. It is allowed to form the groove through etching according to necessity.

Furthermore, though a pair of waveguides is described for this embodiment as an example, the number of waveguides is not restricted to a pair of waveguides. It is also allowed to form a plurality of waveguides on one substrate.

Furthermore, though a linear waveguide is described for this embodiment as an example, this embodiment is not restricted to the linear waveguide. It is possible to apply this embodiment to every optical-waveguide pattern generally used and moreover control bend, branch, and combination of optical waves.

(Fifth Embodiment)

Then, the fifth embodiment is described below.

Figure 4:
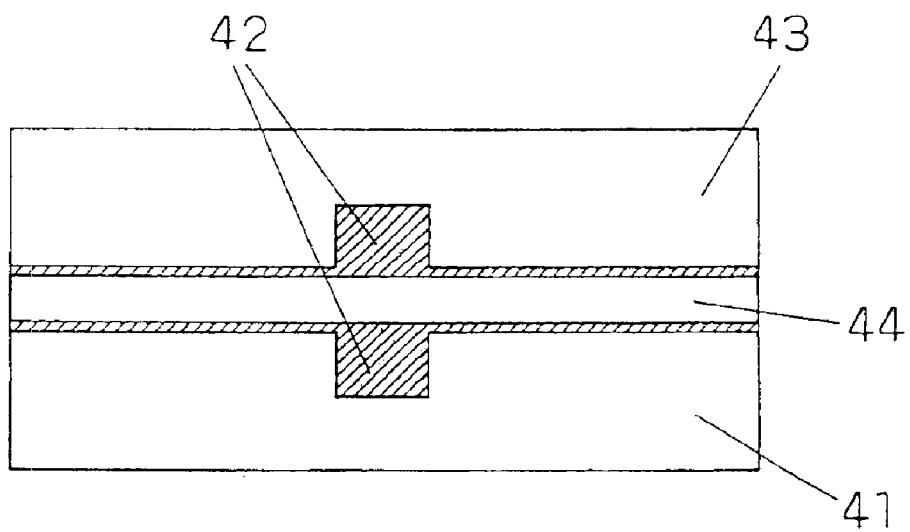
FIG. 4 is an illustration showing an optical waveguide of a fifth embodiment of the present invention.
Figure 5A:
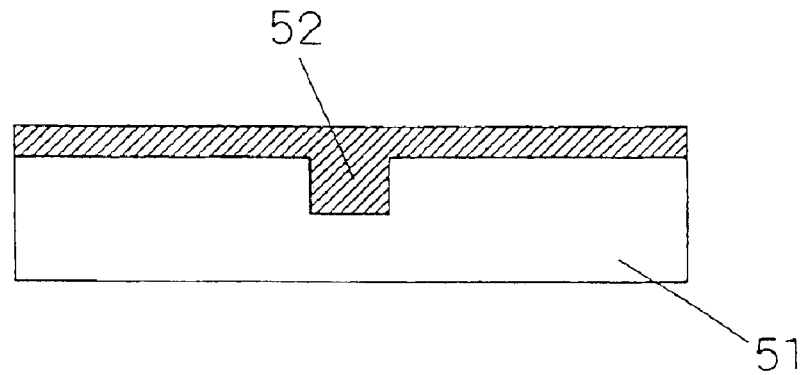
FIG. 5(a) is an illustration showing a step of filling the optical waveguide-groom substrate 51 on which an optical-waveguide groove is formed with the high-refractive-index material 52 used as a core in a conventional optical-waveguide forming method.
Figure 5B:
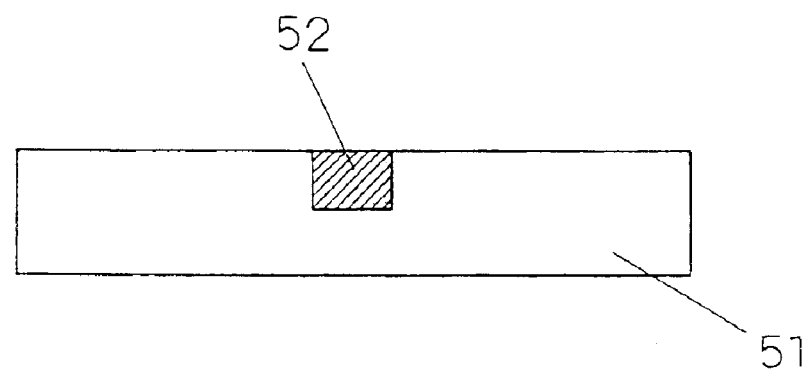
FIG. 5(b) is an illustration showing a step of removing extra high-refractive-index material from the high-refractive-index material having been filled in the step shown in FIG. 5(a) in a conventional optical-waveguide forming method.
Figure 5C:
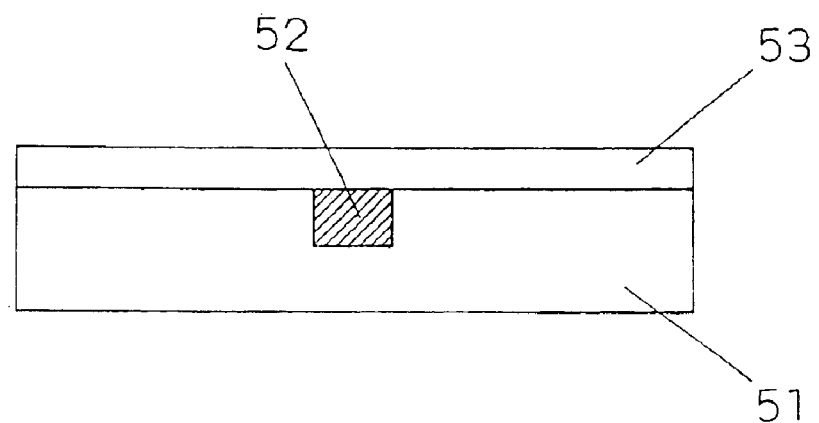
FIG. 5(c) is an illustration showing a step of bonding the clad substrate 53 and the optical-waveguide-groove substrate 51 together in a conventional optical-waveguide forming method.

FIG. 4 is an optical waveguide of the fourth embodiment of the present invention.

As shown in FIG. 4, an optical-waveguide groove is formed on the surface of a first substrate 41 made of glass or transparent resin through molding using a mold (not illustrated). Moreover, an optical-waveguide groove is formed on surfaces of a first substrate 41 and a second substrate 43 through molding using a mold (not illustrated).

Then, an ultraviolet-curing resin is applied to an optical-waveguide-groove forming plane as a high-refractive-index material 42 to fill a groove with the resin. Thereafter, the first optical-waveguide-groove substrate 41 and second optical-waveguide-groove substrate 43 are bonded together through a clad substrate 44 different from the first optical-waveguide-groove substrate 41 and second optical-waveguide-groove substrate 43 in refractive index so that the optical-waveguide grooves are faced each other. By applying ultraviolet radiation, the ultraviolet-curing resin in the groove is cured. By using a material having a refractive index higher than those of the first optical-waveguide-groove substrate 41, second optical-waveguide-groove substrate 43, and clad substrate 44 as an ultraviolet-curing resin, the ultraviolet-curing resin in the groove functions as an optical-waveguide core. By setting the thickness of the clad substrate to several microns, it is possible to easily form a three-dimensional directional coupler.

The first optical-waveguide-groove substrate 41 of this embodiment serves as a first substrate of the present invention, the second optical-waveguide-groove substrate 43 of this embodiment serves as a third substrate of the present invention, and the clad substrate 44 of this embodiment serves as a second substrate of the present invention.

Moreover, though this embodiment uses an ultraviolet-curing resin as an optical-waveguide core material, the core material is not restricted to the ultraviolet-curing resin. It is allowed to use a thermosetting resin or glass-based material.

Furthermore, it is preferable to form an optical waveguide groove through molding as described for this embodiment from the viewpoint of productivity. However, a method of forming the groove is not restricted to molding. It is allowed to form the groove through etching according to necessity.

Furthermore, though this embodiment uses a substrate having a refractive index different from those of the first and second substrates as a clad substrate. However, it is also allowed to use the same substrate by changing refractive indexes through a heat treatment or irradiation with light.

Furthermore, though separate clad substrates are bonded together in the case of this embodiment, it is also allowed to deposit a thin film instead of the above case.

Furthermore, though this embodiment is described by using a pair of waveguides as an example, it is allowed to form a plurality of waveguides on one substrate instead of the above mentioned.

Furthermore, though this embodiment is described by using a linear waveguide as an example, it is not restricted to the linear waveguide. It is possible to apply this embodiment to every optical waveguide pattern and moreover control bend, branch, and combination of optical waves.

As described above, the present invention provides an optical waveguide which can be mass-produced at a low cost and an optical-waveguide forming method.

What is claimed is:

1. An optical waveguide comprising:
   a first substrate having a plane on which an optical-waveguide groove is formed, said first substrate having a first refractive index;
   a second substrate having a second refractive index; and,
   a material layer formed by a material having a further refractive index higher than said first and said second refractive indices, said material layer disposed between said second substrate and said plane of said first substrate,
   said second substrate is bonded to said plane of said first substrate on which said optical-waveguide groove is formed by said material of said material layer,
   said optical-waveguide groove is filled with said material, and
   the first refractive index of said first substrate is different from the second refractive index of said second substrate, said first refractive index being different from said second refractive index to reduce propagation of wave-guiding light through said material layer in a portion of said material layer other than said optical-waveguide groove.

2. The optical waveguide according to claim 1, wherein, assuming the further refractive index of said material as Na, the first refractive index of said first substrate as Nb, the second refractive index of said second substrate as Nc, a thickness of said material present between said second substrate and said portion of said material layer other than said optical-waveguide groove on the plane on which the optical-waveguide groove of said first substrate is formed as d, a depth of said optical-waveguide groove as h, and a wavelength of wave-guiding light as λ, (1) when said Nb is not smaller than said Nc, said Na, Nb, Nc, d, h, and λ simultaneously satisfy the following numerical formulas, $$d \leq \frac{\lambda}{2\pi\sqrt{Na^2 - Nb^2}} \tan^{-1}\left(\frac{\sqrt{Nb^2 - Nc^2}}{\sqrt{Na^2 - Nb^2}}\right) \quad \text{[Numerical Formula 1]}$$

$$\frac{\lambda}{2\pi\sqrt{Na^2 - Nb^2}} \tan^{-1}\left(\frac{\sqrt{Nb^2 - Nc^2}}{\sqrt{Na^2 - Nb^2}}\right) < h \quad \text{[Numerical Formula 2]}$$

and (2) when said Nb is smaller than said Nc, said Na, Nb, Nc, d, h, and λ simultaneously satisfy the following numerical formulas.

$$d \leq \frac{\lambda}{2\pi\sqrt{Na^2 - Nc^2}} \tan^{-1}\left(\frac{\sqrt{Nc^2 - Nb^2}}{\sqrt{Na^2 - Nc^2}}\right) \quad \text{[Numerical Formula 3]}$$

$$\frac{\lambda}{2\pi\sqrt{Na^2 - Nc^2}} \quad \text{[Numerical Formula 4]}$$

$$\tan^{-1}\left(\frac{\sqrt{Nc^2 - Nb^2}}{\sqrt{Na^2 - Nc^2}}\right) < h.$$

3. The optical waveguide according to claim 1, wherein, further optical-waveguide groove is formed on a plane of said second substrate which is bonded to said first substrate, and
the further optical waveguide groove of said second substrate is filled with said material.

4. The optical waveguide according to claim 1, further comprising:
   a third substrate having a plane on which a further optical-waveguide groove is formed, said third substrate having a third refractive index; and
   a further material layer formed of said material and disposed between said plane of said third substrate and a plane of said second substrate opposite said plane of said first substrate,
wherein,
said plane of said third substrate is bonded to said second substrate by said material of said further material layer, the further optical-waveguide groove of said third substrate is filled with said material, said further refractive index of said material is higher than the third refractive index of said third substrate, and the second refractive index of said second substrate is different from the third refractive index of said third substrate.

5. The optical waveguide according to any one of claims 1 to 4, wherein, said material is a glass-based material or resin.

6. The optical waveguide according to claim 5, wherein, said material is a photo-curing resin, and an expression of bonding together by said material denotes bonding together by applying light to said photo-curing resin and curing the resin.

7. The optical waveguide according to any one of claims 1 to 4, wherein, said substrate is formed by a glass-based material or a resin.

8. The optical waveguide according to any one of claims 1 to 4, wherein, concave and convex portions of said optical-waveguide groove are collectively formed through molding by a mold material having concave and convex portions on its surface.

9. An optical-waveguide forming method of forming an optical waveguide having a first substrate and a second substrate bonded to said first substrate, in which an optical-waveguide groove is formed on the bonded plane of at least one of said first and second substrates, comprising:

a step of making a first refractive index of said first substrate different from a second refractive index of said second substrate by applying light to at least one of said first and second substrates and thereby changing at least one of said first and said second refractive indices, respectively; and a step of bonding said first and said second substrates different from each other in said first and said second refractive indices together by a material having a further refractive index higher than said first and said second refractive indices of said first and second substrates, respectively, wherein said first refractive index being different from said second refractive index to reduce propagation of wave-guiding light through said material in a portion of said bonded plane other than said optical-waveguide groove.

10. An optical-waveguide forming method of forming an optical waveguide having a first substrate and a second substrate bonded to said first substrate, in which an optical-waveguide groove is formed on the bonded plane of at least one of said first and second substrates, comprising:

a step of making a first refractive index of said first substrate different from a second refractive index of said second substrate by heating and cooling at least one of said first and second substrates and thereby changing at least one of said first and said second refractive indices, respectively; and a step of bonding said first and said second substrates different from each other in first and second refractive indices by a material having a further refractive index higher than said first and said second refractive indices of said first and second substrates, respectively, wherein said first refractive index being different from said second refractive index to reduce propagation of wave-guiding light through said material in a portion of said bonded plane other than said optical-waveguide groove.

11. The optical-waveguide forming method according to claim 9 or 10, wherein assuming the further refractive index of said material as Na, the first refractive index of said first substrate as Nb, the second refractive of said second substrate as Nc, a thickness of said material present between said second substrate and a portion other than said optical-waveguide groove on the bonding plane on which the optical-waveguide groove of said first substrate is formed as d, a depth of said optical-waveguide groove as h, a wavelength of wave-guiding light as $\lambda$, (1) when said Nb is not smaller than said Nc, said Na, Nb, Nc, d, h, and $\lambda$ simultaneously satisfy the following numerical formulas, $$d \leq \frac{\lambda}{2\pi\sqrt{Na^2 - Nb^2}} \tan^{-1}\left(\frac{\sqrt{Nb^2 - Nc^2}}{\sqrt{Na^2 - Nb^2}}\right) \quad \text{[Numerical Formula 1]}$$

$$\frac{\lambda}{2\pi\sqrt{Na^2 - Nb^2}} \tan^{-1}\left(\frac{\sqrt{Nb^2 - Nc^2}}{\sqrt{Na^2 - Nb^2}}\right) < h \quad \text{[Numerical Formula 2]}$$

and (2) when said Nb is smaller than said Nc, said Na, Nb, Nc, d, h, and $\lambda$ simultaneously satisfy the following numerical formulas.

$$d \leq \frac{\lambda}{2\pi\sqrt{Na^2 - Nc^2}} \tan^{-1}\left(\frac{\sqrt{Nc^2 - Nb^2}}{\sqrt{Na^2 - Nc^2}}\right) \quad \text{[Numerical Formula 3]}$$

$$\frac{\lambda}{2\pi\sqrt{Na^2 - Nc^2}} \tan^{-1}\left(\frac{\sqrt{Nc^2 - Nb^2}}{\sqrt{Na^2 - Nc^2}}\right) < h. \quad \text{[Numerical Formula 4]}$$

12. The optical-waveguide forming method according to claim 10, the step of making the first refractive index of said first substrate different from the second refractive index of said second substrate further comprises the step of, heating the second substrate at a temperature different from the first substrate to change the first and the second refractive indices such that the first refractive index is different from the second refractive index.

13. The optical-waveguide forming method according to claim 10, the step of making the first refractive index of said first substrate different from the second refractive index of said second substrate further comprises the steps of, heating and cooling the first substrate and the second substrate for different periods of time relative to each other to change said first and said second refractive indices such that the first refractive index is different from the second refractive index.

14. The optical-waveguide forming method according to claim 9 or 10, comprising at least one of said first and second substrates is heated and softened to form said optical-waveguide groove by pressing a mold material having concave and convex portions on the surface against the substrate.

* * * * *

UNITED STATES PATENT AND TRADEMARK OFFICE
CERTIFICATE OF CORRECTION

PATENT NO.        : 7,024,087 B2                                        Page 1 of 1
APPLICATION NO.   : 10/432212
DATED             : April 4, 2006
INVENTOR(S)       : Shimada et al.

It is certified that error appears in the above-identified patent and that said Letters Patent is hereby corrected as shown below:

On the cover page, item (56) References Cited, please insert:

U.S. PATENT DOCUMENTS
2002/0018634 A1        02/2002        Korenaga et al.
5,693,116              12/1997        Kanamori et al.
6,343,171              01/2002        Yoshimura et al.

FOREIGN PATENT DOCUMENTS
JP  1/202702           08/1989
JP  06-289348          10/1994
JP  06-258674          09/1994
JP  07-294760          11/1995
JP  2000-028839        01/2000
EP  0933656 A2         08/1999
EP  0718646 A1         06/1996

OTHER PUBLICATIONS
K. Tamir, "Guided-Wave Optoelectronics", XP-002329013, Springer-Verlag, pp. 9-16, 1990.
K. Sugioka, et al., "Vacuum-ultraviolet laser-induced refractive index change of fused silica", Applied Surface Science", pp. 843-847, May 1998.
J. Corpus et al., "Diameter Dependence of the Refractive Index of Melt-Drawn Glass Fibers", Journal of the American Ceramic Society, vol. 76, no. 5, XP-002329012, pp. 1390-1392, 1993.
Supplementary European Search Report corresponding to Application Number EP 01 99 8169 dated July 12, 2005.
Japanese Office Action, dated May 17, 2005.

Signed and Sealed this

Twenty-sixth Day of September, 2006

JON W. DUDAS
*Director of the United States Patent and Trademark Office*